United States Patent [19]
Wachter

[11] 4,039,376
[45] Aug. 2, 1977

[54] METHOD AND APPARATUS FOR INSPECTION OF NUCLEAR FUEL RODS

[76] Inventor: William J. Wachter, 3157 Bel Air Drive, Pittsburgh, Pa. 15227

[21] Appl. No.: 481,961

[22] Filed: June 24, 1974

[51] Int. Cl.² .............................................. G21C 17/06
[52] U.S. Cl. ................... 176/19 LD; 73/552; 73/40
[58] Field of Search ................ 176/19 R, 19 LD; 73/40.5 R, 40.7, 40, 49.1, 67.7; 55/52

[56] References Cited

U.S. PATENT DOCUMENTS

| | | | |
|---|---|---|---|
| 2,180,051 | 11/1939 | Hickman | 55/52 |
| 3,073,767 | 1/1963 | Whitman et al. | 176/19 LD |
| 3,284,991 | 11/1966 | Ploeger et al. | 55/52 |
| 3,419,467 | 12/1968 | Holzer et al. | 176/19 LD |
| 3,529,465 | 9/1970 | Kleesattel et al. | 73/67.7 |
| 3,878,040 | 4/1975 | Martucci | 176/19 LD |
| 3,936,348 | 2/1976 | Wachter et al. | 176/19 LD |

FOREIGN PATENT DOCUMENTS 240,178 2/1961 Australia ................ 176/19 LD Primary Examiner—Samuel W. Engle
Assistant Examiner—S. A. Cangialosi
Attorney, Agent, or Firm—Brown, Murray, Flick & Peckham

[57] ABSTRACT

A method and apparatus are provided for the inspection of nuclear fuel rods to detect defects or failures in such rods. Assemblies of fuel rods are immersed in water and means are provided for causing a change in the relative pressures in the water and within the fuel rod such that fluid is expelled from the rod through any defects that may exist. Means are also provided for thereafter vibrating the rods to cause additional internal fluid or other material that may be trapped in the rod to be expelled. Sensors are provided for detecting the emission of bubbles of fluid or other material from the rod and for locating the position of the defective rod in the assembly.

8 Claims, 5 Drawing Figures

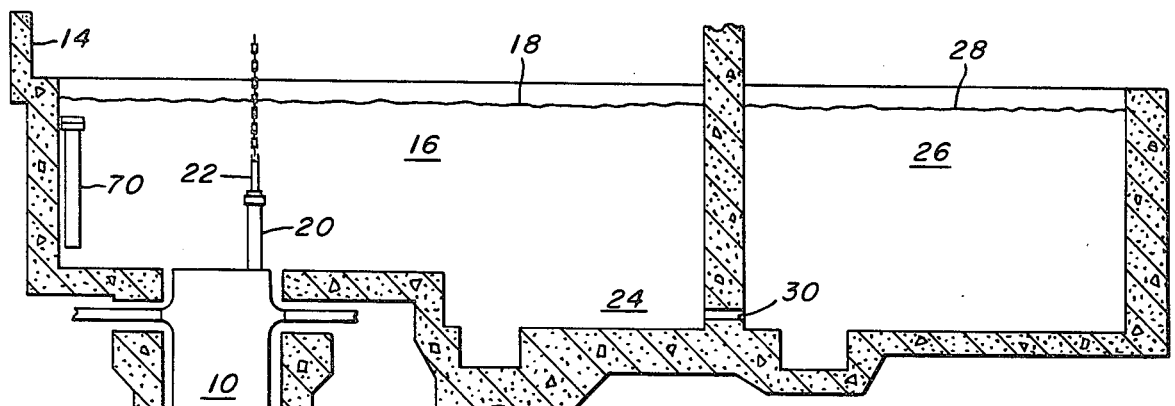
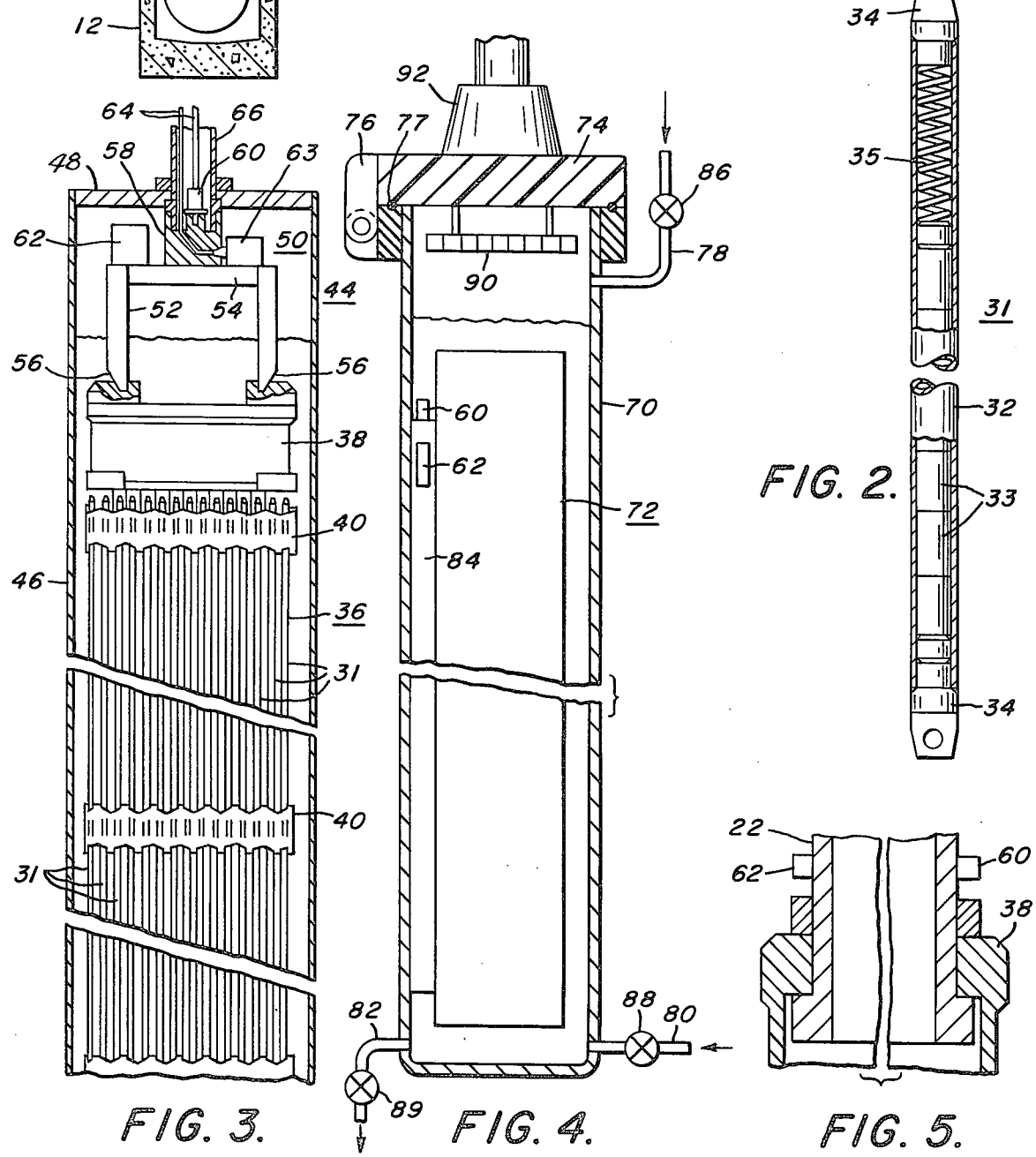

METHOD AND APPARATUS FOR INSPECTION OF NUCLEAR FUEL RODS

BACKGROUND OF THE INVENTION

The present invention relates to the inspection of nuclear fuel rods, and assemblies of fuel rods, to detect and locate defective rods.

The large nuclear reactors utilized for power generation consist of an array of a large number of fuel rods containing nuclear fuel. Each rod comprises a metal tube which may be from 8 to 15 feet long and approximately $\frac{1}{2}$ inch in diameter, and which contains a stack of cylindrical fuel pellets of suitable fissionable material such as uranium oxide. The upper end of the tube is empty of fuel pellets and forms a plenum for a gas or other fluid under substantial pressure which fills the top of the rod and also the small clearance space which is provided around the pellets to allow for expansion or swelling. The fuel rods are supported in parallel groups in fuel assemblies which may typically contain from 49 to as many as 300 fuel rods, and the complete nuclear reactor is made up of a large number of these fuel assemblies arranged in a suitable configuration.

The metal tubes of the fuel rods constitute the primary containment boundary for the radioactive nuclear fuel, and inspection to verify the integrity of the rods is of primary importance. In the manufacture of the fuel rods, the tubing itself and the end cap welds are carefully inspected and helium leak tests of the completed rods are also performed. Since a nuclear reactor may contain as many as 40,000 fuel rods, however, it will be apparent that a significant probability exists that some number of defective tubes will be present even with a highly effective manufacturing quality control program. Furthermore, even initially good fuel rods may develop cracks, pinholes or other defects in service and such defective rods must be detected.

The reactor is usually shut down about once a year for refueling and at this time, as well as during initial installation, the fuel rods must be inspected to detect any defective rods that may be leaking fission products. The reactor and the fuel assemblies are immersed in a pool of water during the refueling operations and during removal of the fuel assemblies for replacement or inspection. In the standard method of inspection which has been used heretofore, the flow of water through each fuel assembly to be inspected is blocked so as to allow the fuel rods to heat up, which causes expulsion of fission products into the water through any defects that may exist in the rods. The water is then checked to detect the presence of radioactivity in the water, indicating that such leakage of fission products has occurred and that a defective rod is present in the assembly being tested. This system requires that the water be pumped to a sampling station and repeatedly analyzed or checked for radioactivity and is a very slow procedure requiring as much as an hour for each fuel assembly. Complete inspection of all fuel rods in a large power reactor is, therefore, very time consuming and may require as much as a week during which the reactor is out of service. This represents a very high cost to the operator of the reactor and a more rapid but simple and reliable inspection method is needed.

In my copending application Ser. No. 595,577, filed July 14, 1975 as a continuation of Ser. No. 376,697, filed July 5, 1973, now abandoned there are disclosed and claimed a method and apparatus for inspecting nuclear fuel rods in a much more rapid and inexpensive but highly reliable manner. This method consists essentially in causing a change in the relative pressures of the fluid within the fuel rods and the water in which they are immersed such that the internal pressure within the rods becomes higher than the external water pressure. If any defect such as a crack or pinhole exists in any of the fuel rods, the result is the expulsion of a bubble or bubbles of fluid or other material from the interior of the fuel rod into the liquid. Sensing means are provided to detect the emission of such bubbles to provide a reliable and instantaneous indication of the presence of the defect and also of the location of the defect. This provides a very sensitive and reliable method of inspection, but it is possible for some of the fluid in the rod to be trapped or adsorbed by the fuel pellets, particularly at the top of the rod, and in some cases such trapped fluid is not expelled and defects in the upper part of the rod may not be detected.

SUMMARY OF THE INVENTION

The present invention provides additional means for detecting defective nuclear fuel rods in those cases where defects may exist which are not readily detectable by the method of the prior application because the fluid is trapped in the rod or otherwise obstructed or prevented from escaping.

In accordance with the present invention, the assembly of fuel rods is first tested in the manner disclosed in the prior application. That is, a change in relative pressure is produced such that fluid within the rod is expelled into the surrounding water through any defect that may exist and the emission of bubbles or other material so expelled is detected. This may be done by any of the means previously disclosed including blocking the flow of cooling liquid so that the fluid in the rod is heated to increase its pressure, or pressurizing the fuel assembly and then releasing the external pressure to reduce the pressure relative to the internal pressure of the fluid within the rod, or by raising the fuel rod assembly in the liquid in which it is immersed to a higher level where the external pressure is lower. Any of these means, or any equivalent means, may be utilized for producing the necessary change in relative pressure, and any suitable means may be utilized to detect the emission of bubbles of fluid. After this process has been completed, the fuel rods or the complete assembly of rods are vibrated by means of any suitable type of vibrator, and this vibration effectively drives out or expels fluid trapped in the upper part of the fuel rod through any defects which may exist there even though such fluid could not have been expelled by the change in pressure. This additional step, therefore, provides an effective and sensitive means for detecting the existence of defects, especially in the upper part of the rod, which were not necessarily detected by the previous method.

BRIEF DESCRIPTION OF THE DRAWINGS

The invention will be more fully understood from the following detailed description, taken in connection with the accompanying drawings, in which:

FIG. 1 is a sectional view of a typical nuclear reactor installation in which the method of the present invention may be used;

FIG. 2 is a sectional view of a typical nuclear fuel rod;

FIG. 3 is a vertical sectional view illustrating one form of apparatus for carrying out the method of the invention;

FIG. 4 is a similar view showing another type of apparatus for carrying out the invention; and FIG. 5 is a partial view of a fuel assembly with a lifting device attached illustrating another means for carrying out the method.

DESCRIPTION OF THE PREFERRED EMBODIMENTS

There is shown in FIG. 1 a typical nuclear reactor installation in which the reactor 10 is supported within a concrete housing 12. The housing 12 forms part of a generally domeshaped concrete enclosure 14 which includes a basin or pool 16 above the reactor 10. Only the lower portion of the enclosure 14 is shown and it will be understood that it may be of any suitable or usual design. Communicating with or forming a part of the pool 16 is a refueling canal or compartment 24 of concrete which extends to the outer wall of the enclosure 14 as shown. During normal operation, the interior of the pool 16 is empty but during refueling operations the pool is filled with water up to a level such as indicated at 18 so that the fuel assemblies are kept immersed in water. Suitable crane or other lifting facilities are provided in the upper part of the enclosure 14, and during the refueling operation, fuel assemblies such as the one indicated at 20 are lifted from the reactor by suitable lifting means or grapples generally indicated at 22 suspended from the crane.

Outside the enclosure 14 there is a spent fuel pit or compartment 26 also of concrete and filled with water up to the level 28. An opening 30 connecting the canal 24 to the pit 26 permits transfer of fuel assemblies from the reactor enclosure to the spent fuel pit. Heretofore, fuel assembies have been transferred for inspection to the pit 26, so as to maintain them within the protective water bath, and by using a special container in the pit 26, circulation of water through the fuel assembly was blocked so that its temperature would rise and radioactive fission products would be expelled through any defect into the water within the container. The water from the container was repeatedly drained and checked for radioactivity to detect the presence of any defective fuel rods. It will be obvious that this was a very time-consuming process and very expensive because of the protracted downtime of the reactor which was necessarily involved.

The copending application mentioned above discloses a method and means for rapid and reliable inspection of nuclear fuel rods to eliminate the costly and time-consuming method previously used. A typical fuel rod is shown by way of example in FIG. 2. The fuel rod 31 comprises a metal tube 32 of a suitable alloy capable of withstanding the severe conditions to which it is subjected during operation, and is usually of considerable length, such as from 8 to 15 feet, and of relatively small diameter which may be of the order of ½ inch. The tube 32 is filled for most of its length with the nuclear fuel pellets 33, which may be made of uranium oxide or other suitable nuclear fuel, and which are of a diameter to fit closely in the tube 32 with a very small radial clearance. The tube is closed at the top and bottom by end caps 34 which are welded in place to form leak-tight closures. The fuel pellets 33 are disposed in a vertical column extending through most of the length of the tube 32 but with an empty space at the top. A spring 35 is disposed in this space to hold the column of fuel pellets in position. The space in the top of the tube, and the small clearance between the pellets and the tube, are filled with a fluid which is usually gas but which may be either gas or a liquid, and which usually will contain fission products. This fluid in the tube 32 is normally maintained under substantial pressure.

A typical fuel rod assembly 36 is shown in FIG. 3. A suitable number of fuel rods 31 is assembled in parallel, closely-spaced relation between a top structure 38 and a bottom support with intermediate supports 40 at intervals throughout the length of the assembly. Other necessary elements, such as control rods and means for operating them, are also provided but have not been shown in the drawing as they are not a part of the present invention. As previously discussed, the metallic tubes 32 of the fuel rods 31 constitute the primary containment for the radioactive fuel and fission products, and any leak or defect such as a crack or pinhole in any of the fuel rods 31 must be detected and located so that the defective fuel rod can be replaced or repaired. As discussed above, such leaks or defects may be detected by changing the relative pressures of the fluid in the fuel rods and of the surrounding water so that the fluid pressure becomes greater than the water pressure, and bubbles of fluid are forced out of the rod into the water through any defects and can be detected.

Most such defects occur near the center of the rod in the region where the temperatures are highest during operation, and this method provides a very sensitive and reliable means for detecting such defects. It is possible, however, that fluid in the upper part of the rod in the space above the fuel pellets may become trapped in the upper end of the rod, and fluid may in some cases be trapped between adjacent fuel pellets or adsorbed on the pellets. In such cases, the change in pressure may not cause emission of fluid through defects near the top of the rod, and while such defects are relatively uncommon, they do occur and are not easily detectable by the change in pressure, since the fluid may be prevented from escaping through the defect. In accordance with the present invention, such defects are detected by vibrating the fuel assembly after the previous steps have been carried out, and such vibration is effective in forcing trapped fluid out through any defects that have not been previously discovered. This additional step therefore makes it possible to reliably detect the few defects or leaks that may be present in areas where they were not previously readily detected.

This additional step may be carried out in connection with any of the types of apparatus shown in the prior application. One such device is illustrated in FIG. 3. As previously mentioned, the fuel assemblies 36 are kept immersed in water when removed from the reactor 10 in order to prevent overheating of the fuel assembly by the radioactive fuel in the rods 31. The apparatus of FIG. 3 comprises a hood 44 placed over the fuel assembly to be inspected to prevent the flow of water through the assembly. The hood 44 consists of a cylindrical body portion 46 of stainless steel sheet, or other suitable material, with a circular top 48 welded to the body. The hood is designed to fit snugly over the fuel assembly 36 as shown in the drawing. When the hood is lowered over the fuel assembly, a certain amount of air is trapped in the hood so that a gas space 50 exists in the top of the hood above the level of the water in which the fuel rods themselves are immersed. Sensing means are provided in the space 50 for detecting the presence and location of any defects in the fuel rods and an anvil 52 is provided in good mechanical contact with the fuel rod assembly. The anvil 52 is shown as consisting of a transverse bar 54 with vertical members welded to each end with beveled lower ends, indicated at 56, for engagement with correspondingly beveled surfaces provided on the top structure 38 of the fuel assembly. A metal block 58 is welded or otherwise rigidly attached to the transverse bar 54 of the anvil and a mechanical vibration sensor 60 is mounted on the block 58 to detect any vibration transmitted to the anvil 52 from the fuel assembly. A vibrator 62 is also mounted on the transverse bar 54 to transmit vibration to the anvil 52 and thus to vibrate the entire fuel assembly 36. The vibrator 62 may, for example, be an electro-mechanical transducer or any other desired type of device which will mechanically vibrate the fuel assembly.

When the hood 44 is lowered into place over the fuel assembly 36, it effectively prevents circulation of the cooling water through the fuel assembly and the temperature of the fuel rods rises. Since this increases the pressure of the fluid in each of the fuel rods, any defect or crack will permit the expulsion of a bubble of fluid or other material from the interior of the defective rod into the surrounding water. The emission of such a bubble produces a sound or mechanical vibration of the fuel rod which is transmitted to the anvil 52 and picked up by the sensor 60. An output signal from the sensor thus occurs immediately upon emission of a bubble, and the existence of a defective fuel rod is thus indicated.

In those instances where fluid is trapped, or otherwise held, in the upper part of the fuel rod, defects near the top of the rod may not be detected in this way. After any bubbles emitted as a result of the change in pressure described above have been detected, and emission of all such bubbles has ceased, the vibrator 62 is turned ON to vibrate the fuel assembly 36. This vibration may be at any desired frequency and its effect is to drive out any trapped fluid through any defects that may be present, so that an additional bubble or bubbles will appear as a result of the vibration it there are any previously undetected defects. The emission of such bubbles due to the vibration is detected in the same manner as before and indicates the presence of such defects. Thus, by providing this additional step of vibrating the assembly, those few defects which were not previously detectable because of their location in areas where fluid might be trapped can now be reliably and positively detected. The leads 64 from the sensors and the vibrators are conveniently brought out through a lifting rod 66 at the top of the hood and may be connected to suitable indicating, recording and control equipment.

Since there may be a relatively large number of fuel rods in the assembly, it is usually desirable to determine the location of a defective rod as well as its presence. This may be done, as more fully disclosed in the prior application, by observing the position of the emitted bubble on its arrival at the surface of the water within the hood, and the vertical position of the defect may be determined by observing the time interval between the emission of the bubble of fluid and its arrival at the surface. For this purpose, suitable sensing devices indicated at 63 may be mounted in the top of the hood and calibrated to give the desired indications.

It will be seen that inspection of the fuel assemblies by means of the hood 44 can easily and quickly be carried out. This may be done either in the pool 16 itself or in the canal 24 merely by lowering the hood over the fuel assembly to be inspected, observing or recording any signals from the sensors 62 and 63, thereafter actuating the vibrator 62 and observing or recording any further signals from the sensors. Fuel assemblies with defective fuel rods can thus easily and quickly be found, even if the defects are in the upper part of the rod where they were not easily detectable by previous methods.

In the apparatus shown in FIG. 3, the change in relative pressure between the fluid within the fuel rod and the water outside is caused by allowing the rod to heat to increase the internal pressure. The method can also be practiced by reducing the external pressure and means for doing this is shown in FIG. 4. As there shown, a tank or pressure vessel 70 is utilized. The tank 70 is a generally cylindrical metal tank designed to be capable of withstanding substantial internal pressure and is made of the proper size to contain a fuel assembly 72 with some open space at the top. The fuel assembly 72 may be of any desired type such as the fuel assembly 36 of FIG. 3. A cover 74 is provided which may be hinged in place as indicated at 76 and provided with suitable sealing means, such as the O-ring 77, so that the cover can be securely sealed when closed. A connection 78 for a gas supply is provided near the top of the tank 70, and a water supply line 80 and a suction or discharge line 82 are provided at the bottom of the tank. An anvil 84 is provided within the tank which may be a vertically disposed metal bar arranged to be in mechanical contact with the fuel assembly 72. A vibration sensor 60 and a vibrator 62, as previously described, are placed on the anvil 84.

In the use of the tank 70, the fuel assembly 72 to be tested is lowered into the tank which is immersed in water, in the reactor pool or otherwise, and the cover 74 of the tank is closed and sealed. The water contained in the tank is then pumped out through the drain line 82, and the tank and fuel assembly are pressurized with a suitable gas, such as air or nitrogen, to any desired pressure which may, for example, be in the range of 1/10 pound per square inch up to 600 pounds per square inch. The gas is admitted through the supply line 78 until the desired pressure is reached and is held at this pressure by means of a valve 86. The pressure in the tank is transmitted through any defect in any of the fuel rods so that the internal pressure in any defective rod is the same as that in the tank. Water is then pumped in through the line 80 under the same pressure as that of the gas, and the tank is filled with water under this pressure to a depth sufficient to submerge the fuel assembly 72, the gas being permitted to exhaust as necessary through the valve 86. A valve 88 is provided in the water line 80 to hold the desired pressure in the tank 70. When the tank is thus fully pressurized and filled with water, a valve 89 in the drain line is opened to release the water pressure. This causes a sharp drop in water pressure in the tank and any defective fuel rod in the fuel assembly 72 is then at a higher internal pressure than that of the water so that a bubble or bubbles of fluid will be emitted. The sound or mechanical vibration resulting from the emission of a bubble is transmitted through the anvil 84 and detected by the sensor 60 so that an immediate indication of the defect is obtained. After such emission of bubbles has been observed and recorded, the vibrator 62 is actuated to vibrate the fuel assembly and causes emission of trapped fluid through any additional defects, as previously described, and any additional emissions are observed and recorded.

The same types of sensors described in connection with FIG. 3 can, of course, be used in the tank 70 to detect the emission of bubbles and to locate their positions upon reaching the surface of the water. As shown in FIG. 4, however, and as more fully described in the prior application, another sensing means may be used for locating the position of the bubble, comprising a grid 90 mounted on the cover 74, which is made of a clear plastic, with a closed-circuit television camera 92 to provide a picture at any desired remote location. The position of a bubble arriving at the surface of the water can thus be accurately determined and, if desired, sensing means may also be provided to measure the time interval between the emission of the bubble and its arrival at the surface to determine its vertical position. Any desired type of sensors may thus be utilized in either of the devices of FIGS. 3 and 4 to detect the occurrence and location of bubbles emitted from a defective fuel rod.

A reduction in the water pressure surrounding a fuel assembly is also obtained in a much simpler manner during the refueling or inspection operation. When the fuel assemblies are in place in the reactor 10, they are submerged in water to a considerable depth which may be of the order of 60 feet. In the refueling operation, the fuel assemblies are lifted vertically out of the reactor so that their depth of immersion is substantially reduced. If, for example, the fuel assembly is thus raised so that its depth of immersion is only about 30 feet, the pressure of the water surrounding the fuel rod is reduced by one-half. This reduction in external pressure is sufficient to cause the emission of a bubble as previously described which can be utilized as an indication of the presence of a defective fuel rod in the assembly. The lifting means or grapple 22 utilized during refueling is shown in an enlarged fragmentary view in FIG. 5, and engages under shoulders formed in the top structure 38 of the fuel assembly to lift the fuel assembly vertically as shown in FIG. 1. This provides a sufficient mechanical contact with the fuel assembly to transmit vibration, and a vibration sensor 60 as previously described is mounted on the grapple 22 to detect the vibration or sound resulting from the emission of a bubble from any of the fuel rods. A vibrator 62 is also mounted on the grapple 22 through which vibration can be transmitted to the fuel rods to drive out any trapped fluid as previously described. The presence of a defective fuel rod is thus easily detected by using the reduction in external pressure which inherently occurs when the depth of immersion is reduced.

It will be apparent that the process of inspection of nuclear fuel assemblies is greatly facilitated and the time required greatly reduced by utilization of either the hood of FIG. 3 or the tank of FIG. 4, and that an especially quick and convenient means for performing the inspection is provided by placing a sensor and a vibrator on the grapple 22 as in FIG. 5. When this is done, each fuel assembly is raised in turn from the reactor and the emission of any bubble or bubbles noted. After all such signals due to the pressure change have been observed and recorded, the vibrator 62 is turned ON to vibrate the assembly, expelling any internal fluids trapped in the fuel rod, and any such further signals are noted and recorded. Fuel assemblies which may have a defective rod are thus quickly sorted out from the good assemblies without adding any appreciable amount of time to that required in any event for the refueling operation, which involves raising and replacing fuel assemblies and changing their positions in the reactor. Thus, the time required is not increased except that those fuel assemblies in which the presence of a defective fuel rod is indicated must be further examined. This can readily be done by means of the tank 70 of FIG. 4 which can conveniently be located, either permanently or temporarily, at one side of the pool 16 as indicated in FIG. 1. Suspect fuel assemblies can then be placed in the tank 70 and checked in the manner previously described. A very rapid but highly reliable inspection method is thus provided. The position of a defective fuel rod in the assembly can be quite accurately determined, and even in large assemblies the position of the defective rod can be located within a region of from 4 to 8 rods. These rods can then be removed and individually checked or the entire group of rods can be replaced.

The sensors utilized in any embodiment of the invention may be of any suitable type, any may be designed to provide visual or audible signals, or any other desired type of output, and may be connected to a read-out system of any type which may provide a permanent record if such a record is desired. The addition of the vibrator makes it possible to drive out fluid trapped at the top of the fuel rod or trapped by the fuel pellets or adsorbed on their surface. Defects, especially at the top of the rod, which were not previously readily detectable can thus be detected. The vibrator may be of any suitable type and any desired frequency of vibration may be used.

It should now be apparent that a method has been provided for inspection of fuel rods for nuclear reactors of any type and that the method may be carried out by means of any desired apparatus, certain preferred types of apparatus being disclosed above. The new method is essentially that of my prior application referred to above with the addition of means for vibrating the fuel rod assembly, which makes it possible or detect certain defects which were not previously readily detectable. A highly reliable and very sensitive method for inspecting fuel rods is therefore provided which is applicable to any type of reactor and which may be carried out in any desired manner.

I claim as my invention:

1. A method of detecting defects in nuclear fuel rods immersed in a liquid, said fuel rods containing fuel pellets and a fluid, said method comprising the steps of including a change in the relative pressures of said liquid and said fluid such that the pressure of the fluid is higher than that of the liquid, detecting mechanical vibration of said fuel rods induced by emission into the liquid of material expelled from a rod, and thereafter externally vibrating the rod and detecting emission of additional material expelled from the rod.

2. The method of claim 1 in which the pressure change is induced by raising the temperature of the fuel rods to increase the pressure of the fluid.

3. The method of claim 1 in which the depth of immersion of the fuel rods in the liquid is reduced to decrease the liquid pressure around the fuel rods.

4. The method of claim 1 in which the pressure change is induced by the steps of pressurizing the fuel rods with gas at a predetermined pressure, immersing the fuel rods in liquid at the same pressure, and releasing the pressure on the liquid.

5. Apparatus for detecting defective nuclear fuel rods immersed in a liquid, said fuel rods containing fuel pellets and a fluid, said apparatus comprising means for effecting a change in the relative pressures of the liquid around the fuel rods and of said fluid such that the pressure of the fluid is higher than that of the liquid, means for detecting vibration of the fuel rods induced by emission of material from a rod into the liquid external means for further vibrating said fuel rods, and means for detecting emission of additional material expelled from said fuel rods due to said further vibrating.

6. The apparatus of claim 5 including a hood adapted to fit over said fuel rods to prevent flow of liquid thereover, means in said hood for causing vibration of the fuel rods, and means in the hood for detecting emission of material from a rod into the liquid.

7. The apparatus of claim 5 including lifting means for raising said fuel rods in the liquid to a region of lower pressure, vibrator means on said lifting means, the lifting means being adapted to engage the fuel rods in a manner to transmit vibration thereto, and means on the lifting means for detecting emission of material from a rod into the liquid.

8. The apparatus of claim 5 including a tank adapted to received said fuel rods, means for closing and sealing said tank, means for supplying gas under pressure to the tank, means for draining liquid from the tank and supplying liquid to the tank under pressure at least equal to the gas pressure, means in the tank for vibrating the fuel rods, and means in the tank for detecting emission of material from a rod into the liquid.

* * * * *